US007481126B2

(12) United States Patent
Las Navas Garcia

(10) Patent No.: US 7,481,126 B2
(45) Date of Patent: Jan. 27, 2009

(54) PRECISION TABLE

(76) Inventor: Jose Maria Las Navas Garcia, Camarena 201 6 C, Madrid (ES) 28047

( * ) Notice: Subject to any disclaimer, the term of this patent is extended or adjusted under 35 U.S.C. 154(b) by 855 days.

(21) Appl. No.: 11/028,722

(22) Filed: Jan. 5, 2005

(65) Prior Publication Data
US 2006/0156838 A1    Jul. 20, 2006

(51) Int. Cl.
    *F16H 25/22* (2006.01)
(52) U.S. Cl. .................. 74/89.23; 74/89.33; 74/89.36
(58) Field of Classification Search .............. 74/89.23, 74/89.36, 89.4, 89.33
    See application file for complete search history.

(56) References Cited

U.S. PATENT DOCUMENTS

| 2,982,145 | A | * | 5/1961 | Orner ..................... 74/89.33 |
| 3,241,389 | A | | 3/1966 | Brouwer |
| 3,719,879 | A | | 3/1973 | Marcy |
| 3,913,412 | A | | 10/1975 | Hart et al. |
| 3,977,269 | A | | 8/1976 | Ilinley, Jr. |
| 3,991,478 | A | | 11/1976 | Stone |
| 4,148,235 | A | | 4/1979 | Gerth |
| 4,195,538 | A | | 4/1980 | Brown |
| 4,302,981 | A | | 12/1981 | Wayman |
| 4,372,222 | A | | 2/1983 | Tice |
| 4,372,223 | A | * | 2/1983 | Iwatani ..................... 108/143 |
| 4,440,050 | A | | 4/1984 | Kagerer |
| 4,597,303 | A | * | 7/1986 | Nakaya ..................... 74/89.32 |
| 4,669,359 | A | | 6/1987 | Shiba |
| 4,768,698 | A | | 9/1988 | Brown et al. |
| 5,215,296 | A | | 6/1993 | Adams et al. |
| 5,301,933 | A | | 4/1994 | Inoue |
| 5,329,825 | A | | 7/1994 | Askins |
| 5,586,468 | A | * | 12/1996 | Tomotaki ..................... 74/89.36 |
| 5,795,119 | A | * | 8/1998 | Goellner ..................... 411/288 |
| 5,937,702 | A | * | 8/1999 | Erikson et al. ........... 74/424.95 |
| 6,367,788 | B1 | | 4/2002 | Babchuk |
| 6,408,526 | B1 | | 6/2002 | Montesanti et al. |
| 6,561,049 | B2 | * | 5/2003 | Akiyama et al. ........... 74/89.32 |

* cited by examiner

*Primary Examiner*—William C Joyce
(74) *Attorney, Agent, or Firm*—Robert J. Epstein; Epstein Drangel; Bazerman & James, LLP

(57) ABSTRACT

Precision movement of a table part by movement of a nut over a lead screw is achieved by a less rigorously precise structure than has heretofore been thought necessary. To that end the screw is fixedly supported only at one end and is rotatable in bearings mounted within a rigidly mounted tube which at least partially surrounds the screw, play in those bearings is minimized by exerting axial pressure thereon, the nut is especially designed to engage the screw only at separated points, thereby to reduce friction and play in the nut, and the nut is connected to the moveable table part by structure passing through an opening in the tube and resiliently engaging the moveable table part to compensate for displacement and play.

19 Claims, 6 Drawing Sheets

PRECISION TABLE

FIELD OF THE INVENTION

The invention relates to a mechanical precision device such as a precision table that can be useful in a variety of linear movement applications.

BACKGROUND OF THE INVENTION

A wide variety of linear translation devices are known, most of them involving a table slideable over a supporting part and moved by rotation of an externally threaded shaft on which an internally threaded nut is mounted for movement along the axis of the shaft. The shaft is driven either directly or indirectly by a motor or other appropriate drive mechanism. A typical mechanical arrangement involves fixedly supporting the shaft at two spaced points precisely rigidly mounted independently of the moveable part, and also providing very precise machined surfaces on the table and on the supporting part over which the table is slideable, precise alignment of the shaft with the direction of movement of the table being necessary to avoid jamming or stiff resistance to shaft rotation. The relationship between nut and screw also presents problems. If the nut fits the screw too tightly rotation is impeded and vibration tends to occur. If the nut fits too loosely the resultant play reduces precision. All of this in turn requires the use of costly manufacturing equipment and adds complication and expense to the manufacture of the tables. A need exists, therefore, for a simple yet rigid linear translating device that is relatively easy and inexpensive to manufacture, and which is both accurate and useable for a variety of needs for linear precise movement. This is today particularly important in various industries, in carrying out research, and in laser positioning.

SUMMARY OF THE INVENTION

The prime object of the present invention is therefore to provide a linear translation device which is highly accurate but which is composed of easily manufactured parts, reliable and simple to maintain, and insensitive to shock or bad handling. This object is achieved, in accordance with the present invention, by a novel mounting of the lead screw and a novel connection of the lead screw to the moveable table parts.

The moveable table part slides relative to a stationary table part. The lead screw is mounted at one end so as to be supported fixedly with respect to the stationary table part. The other end of the screw need not be so mounted. Rigid parallelism between the screw and the direction of movement of the table is not required.

The nut on the screw is operatively connected to the moveable table part by structure which compensates for any departure of the screw action from such exact parallelism. A structural element such as a tube at least partially surrounds the screw, operatively engages the far end of the screw and helps to support it. The screw rotates in bearings, some of which may be supported by the structural element, and axial pressure may be exerted on those bearings, from that structural support or otherwise, in order to minimize bearings play. The mechanical connection between the nut and the moveable table part resiliently engages the latter by means of structure which will act without substantial loss of precision, despite minor displacements of the part relative to its ideal location. When, as mentioned, the screw is at least partially surrounded by a tube, that mechanical connection between nut and moveable table part passes through a slot in that tube. In addition, to reduce friction and play in the nut on the screw, the nut may be partly split intermediate its length with means provided for adjusting the relative position of the two parts produced by the split, thereby to cause the nut to engage the screw only at a limited number of spaced areas, reducing friction and play.

Each of these structural arrangements contributes to the achievement of very high precision in moving the moveable table part while utilizing relatively inexpensive mechanical parts which can be readily assembled and disassembled without compromising the overall precision of the assembly.

DESCRIPTION OF THE DRAWINGS

To the accomplishment of the above, and to such other objects as may hereinafter appear, the present invention relates to the construction of a precision table or the like as described in this specification and as disclosed in the following drawings, in which.

DETAILED DESCRIPTION OF THE INVENTION

Figure 1:
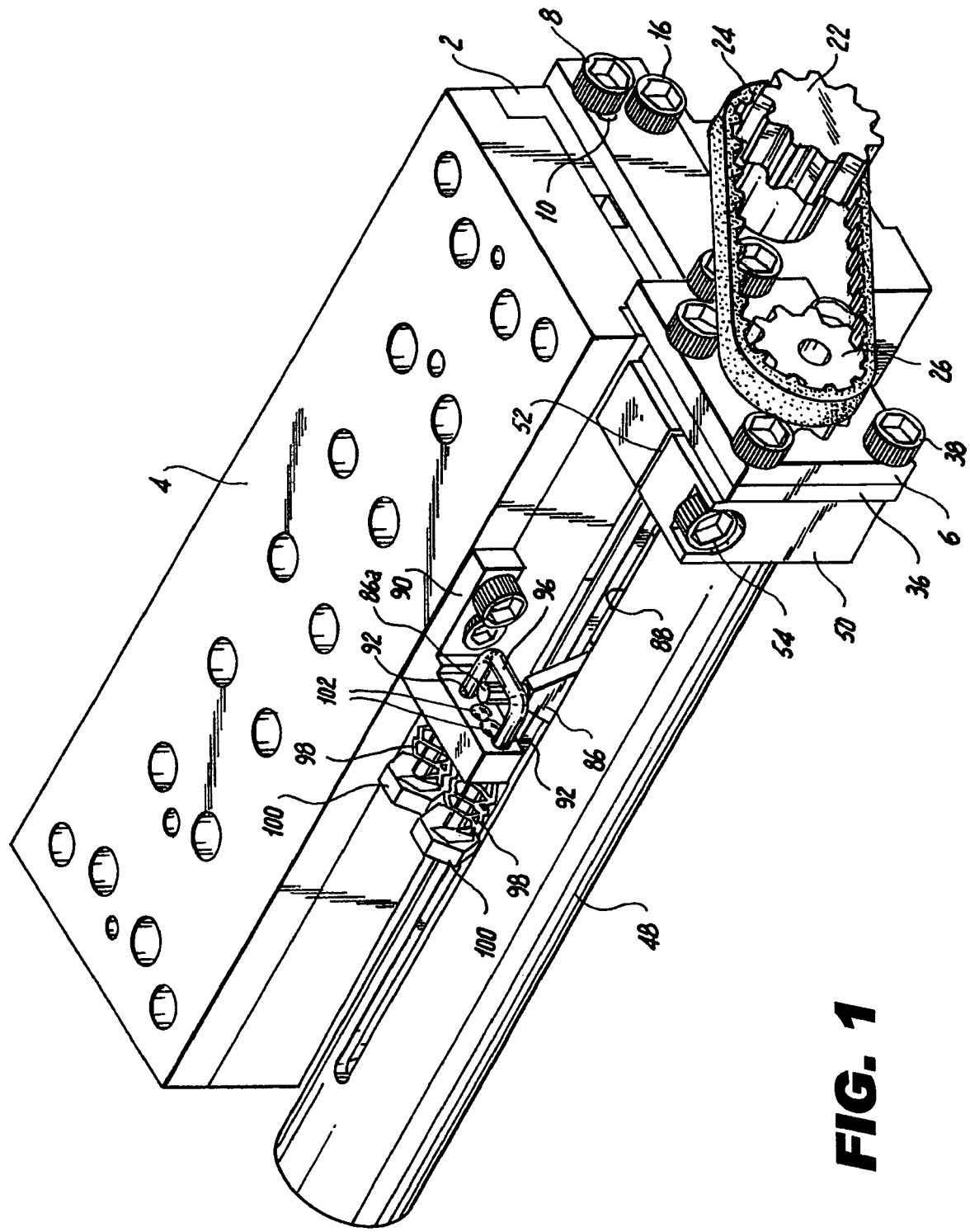
FIG. 1 is a three-quarter perspective view of a preferred embodiment of the present invention with the parts directly connecting the nut with the moveable table separated from their normal operating position for purpose of illustration.
Figure 2:
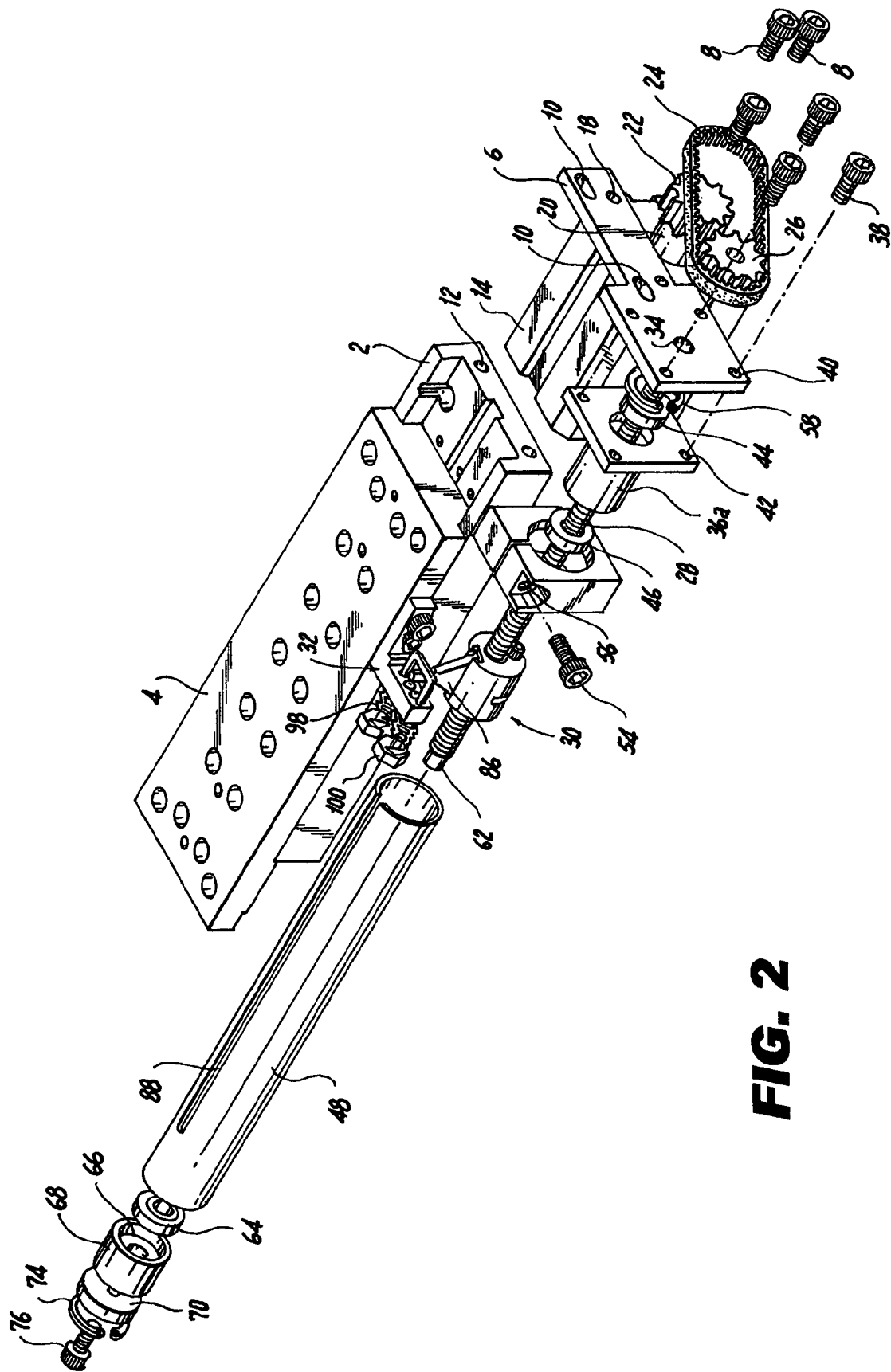
FIG. 2 is an exploded view of the moveable table of FIG. 1.

A typical table comprises a fixed part generally designated 2 and a moveable part generally designated 4 slideable thereover, the engaging surfaces of those tables being cooperatingly shaped and machined so that the table 4, as it is moved, slides smoothly and accurately over the fixed part or base 2. The means for accurately moving the table 4 over the fixed part 2, a preferred embodiment of which is here specifically disclosed, comprises a support plate 6 secured to the base 2 by screws 8 passing through holes 10 in the support plate 6 and being received in holes 12 in the table base 2. All of the operative parts of the table moving means are mounted on that support plate 6.

In the embodiment here specifically disclosed the table part 4 is designed to be moved by means of a motor 14 secured to the support plate 6 by screws 16 passing through holes 18 in the support plate 6 and engaging the motor 14. The motor has an output shaft 20 with a driving part 22, such as a gear or the like. A preferably internally toothed drive belt 24 drivingly connects that driving part 22 to a driven part 26 on the end of an elongated externally threaded lead screw 28. Mounted on the lead screw 28 is an internally threaded nut 30 which, when the screw 28 is rotated, will move along the screw. The nut 30 is connected by structure generally designated 32 to the moveable table part 4 so that the two will move together.

The lead screw 28 is rotatably mounted on the support plate 6 with one end thereof, to which the driven part 26 is connected, passing through a hole 34 in the support plate 6. The lead screw 28, as here specifically disclosed, is mounted in cantilever fashion on the support plate 6 by the front end retainer 36 secured to the support plate 6 by screws 38 passing through holes 40 in the support plate 6 and threaded in holes 42 in the front end tube support 36 which includes forwardly extending cylindrical portion 36a. Received within the front end tube support portion 36a are a pair of ball bearings 44 and 46 which support the right-hand end of the lead screw 28.

Figure 3:
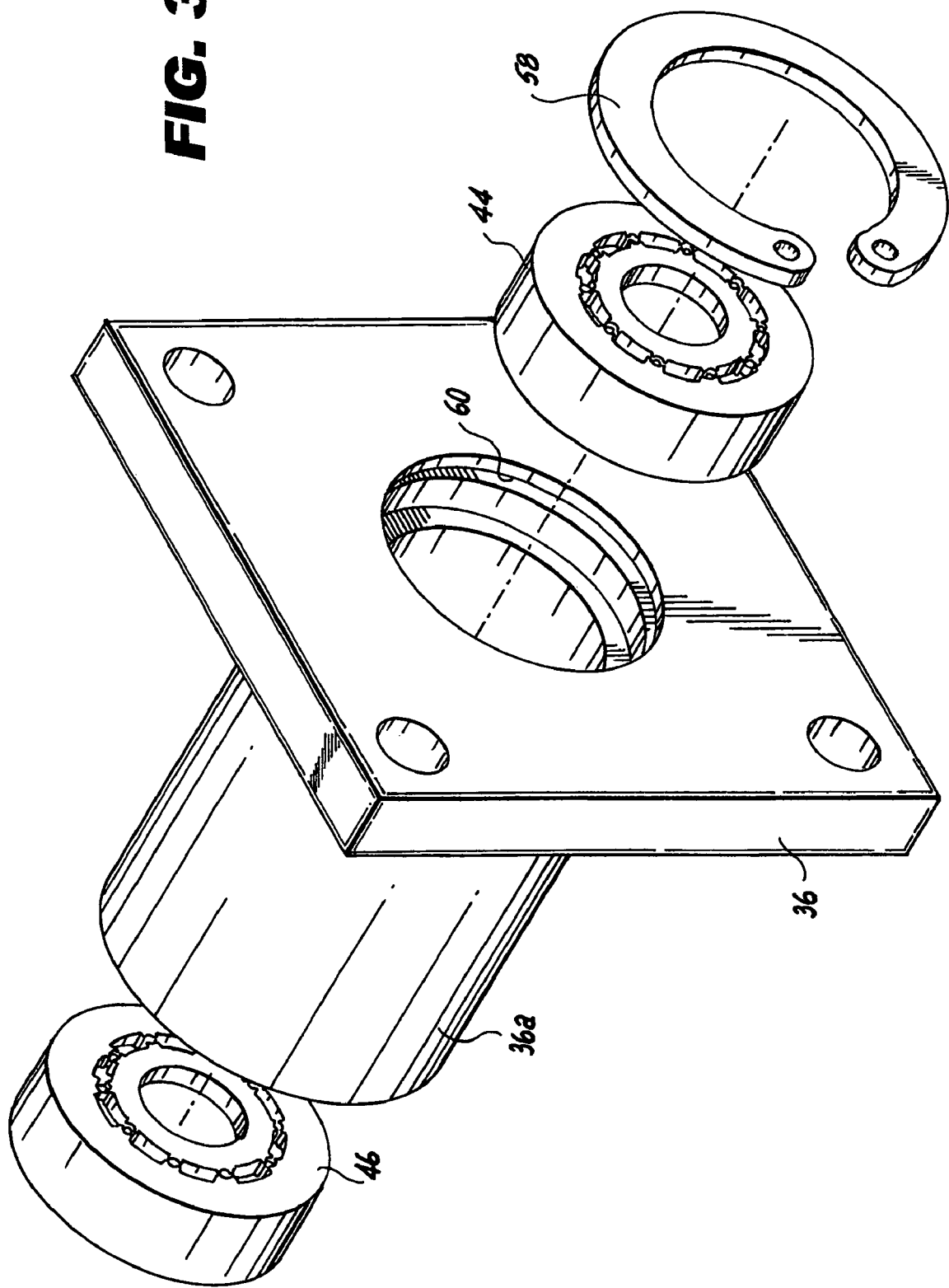
FIG. 3 is an exploded perspective view on an enlarged scale of the parts which support one end of the lead screw.

The lead screw 28 extends through an elongated tube 48 the right-hand end of which extends over the cylindrical portion 36a of the front end tube support 36, and is there held in place by the locking bracket 50 which is split at 52 and which is telescoped over the portion 36a and clamped about the right-hand end of the tube 48 by means of a screw 54 passing through the hole 56 in one of the split parts and being threadedly engaged in the opposing split part. The bearing 44 is retained within the front end tube support 36 by means of spring retainer 58 received within slot 60 on the inner surface of the tube support 36 (see FIG. 3).

Figure 4:
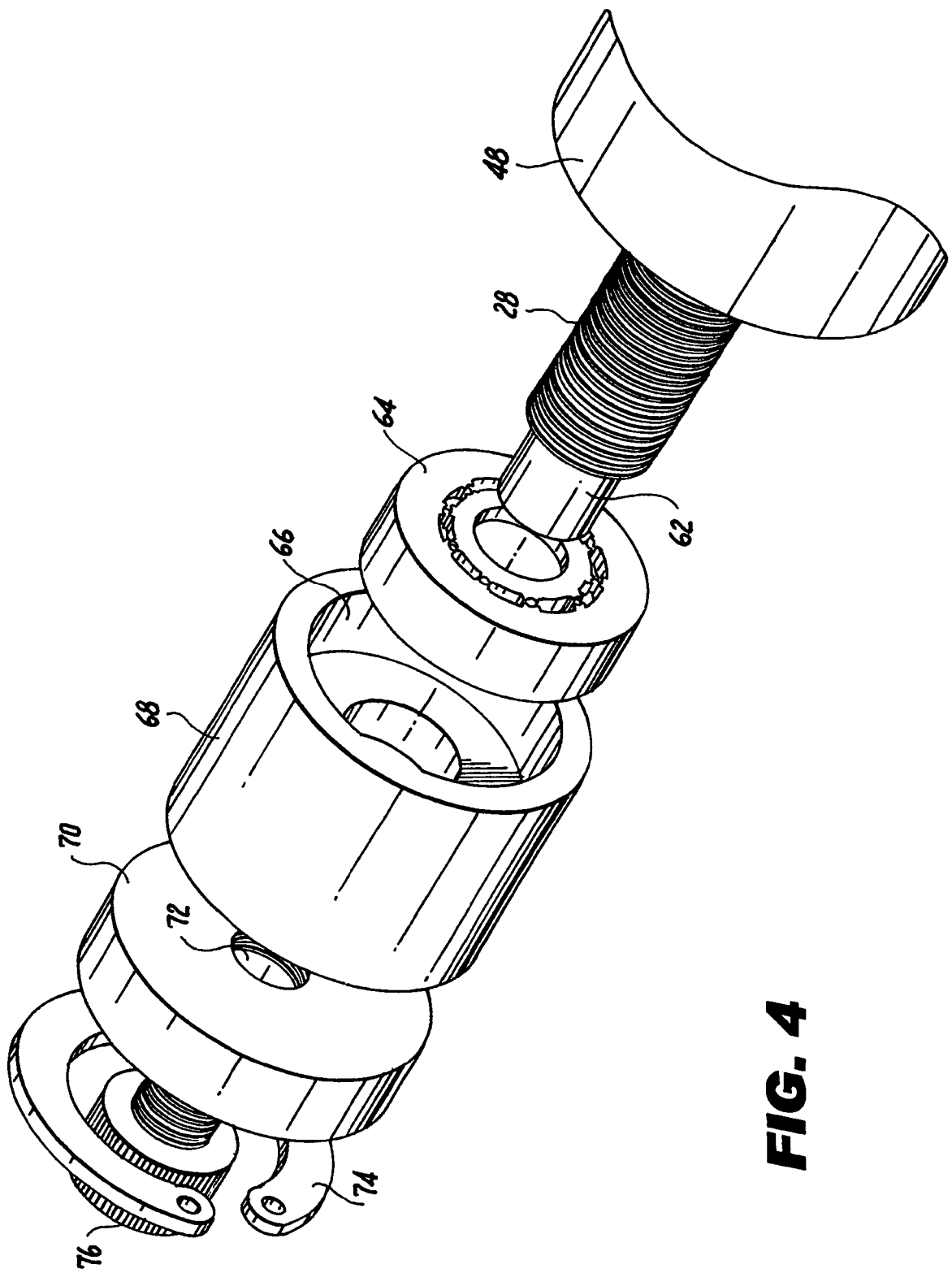
FIG. 4 is a view similar to FIG. 3 but showing the parts which support the other end of the lead screw.

As is particularly shown in FIG. 4, the lefthand end 62 of the lead screw 28 is mounted in ball bearing 64 received within a countersunk portion 66 of a tube end bearing housing 68 which is substantially closed at its lefthand end and which is received within the lefthand portion of the tube 48. Also received within the tube 48 to the left of the bearing housing 68 is a support 70 having an internally threaded central aperture 72 for receiving an adjustment screw 76. The aperture 70 abuts against the lefthand end of the bearing housing 68 and is retained within the tube 48 by means of expansible locking ring 74. The adjusting screw 76 engages the lefthand end of the bearing housing 68 so that when it is screwed through the support 70 it urges to the right the bearing housing 68 and the bearing 64 carried thereby, that exerts axial pressure on the lead screw 28, and that in turn exerts axial pressure on the bearings 46 and 48. The portions of the screw 28 which are received within the bearings 44, 46 and 64 are of lesser diameter than the externally threaded portion. Thus pressure exerted on the lefthand end of the screw 28 by means of the bearing housing 68 as produced by the adjustment of the screw 76 urges the screw 28 to the right and the externally threaded portion of the screw 28 in turn urges the bearings 44 and 46 to the right, thus in effect firmly and precisely locating and loading the bearings to produce minimal play in the bearings while facilitating the rotation of the screw 28.

Figure 6:
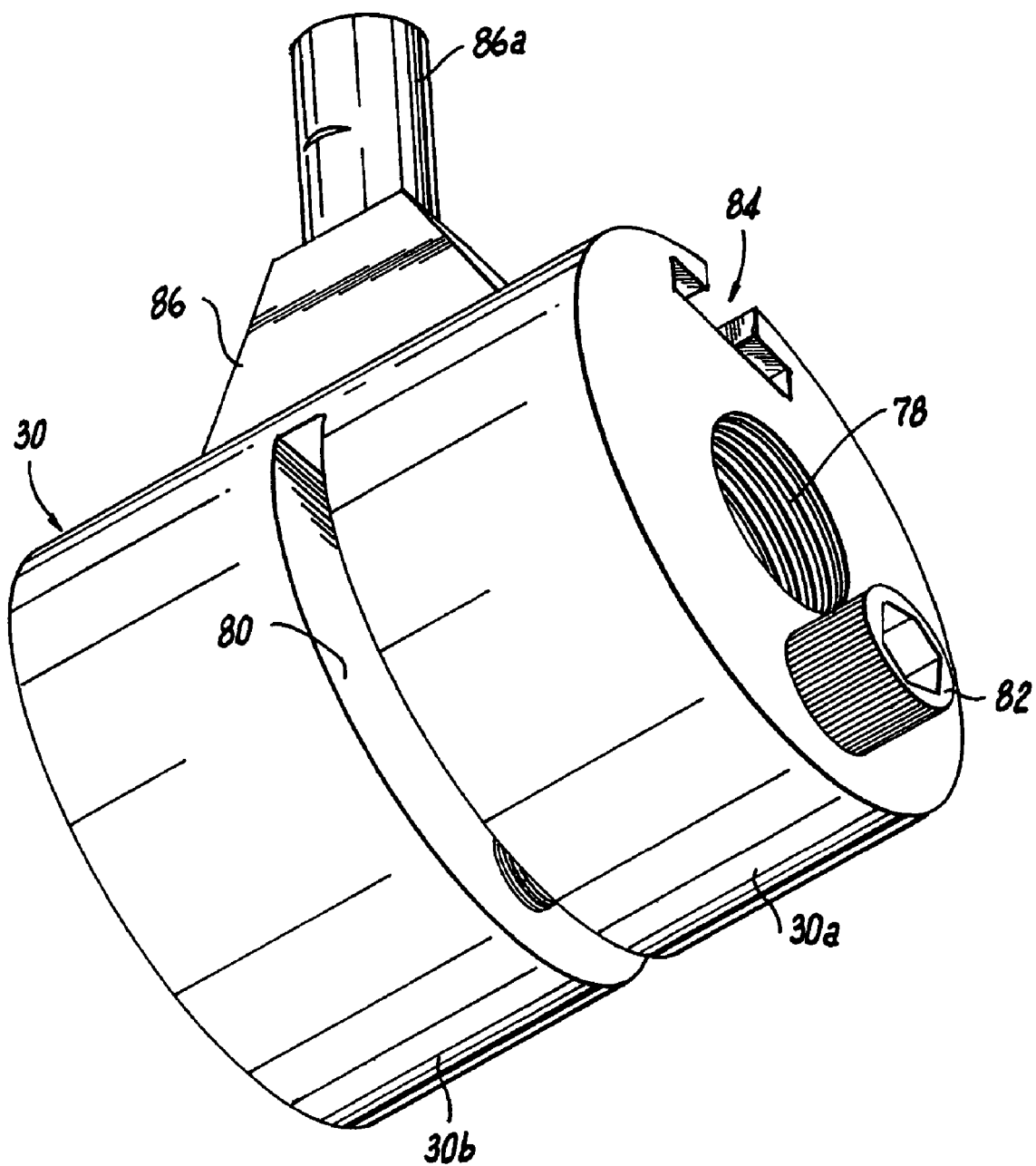
FIG. 6 is a three-quarter perspective view on an enlarged scale of a slotted nut which rides over the lead screw.

As is best shown in FIG. 6, the nut 30 threadedly received on the screw 28 is of appreciable length and provided with an internally threaded axial opening 78 and a transverse slot 80 approximately mid-way of the length of the screw 30 and extending approximately one-half of the width of the screw 30, that slot 80 intersecting the axial opening 78 to produce split portions 30a and 30b. A screw 82 passes through split portion 30a and engages split portion 30b, the screw 82 having threaded engagement with at least one of those split portions so that rotation of the screw 82 will cause those split portions 30a and 30b to move toward and away from one another. If the screw 82 is rotated to cause the split portions 30a and 30b to separate the actual thread engagement between the nut 30 and the screw 28 will only occur at a limited number of areas. Theoretically the nut will engage the screw at two points at the bottom of the nut at its axial ends and at a third point at the top of the nut approximately mid-way of its length. This minimizes friction, making it easier for the screw to rotate, minimizes play between the screw and the nut, and permits modification of the nut as it wears down in use.

Figure 5:
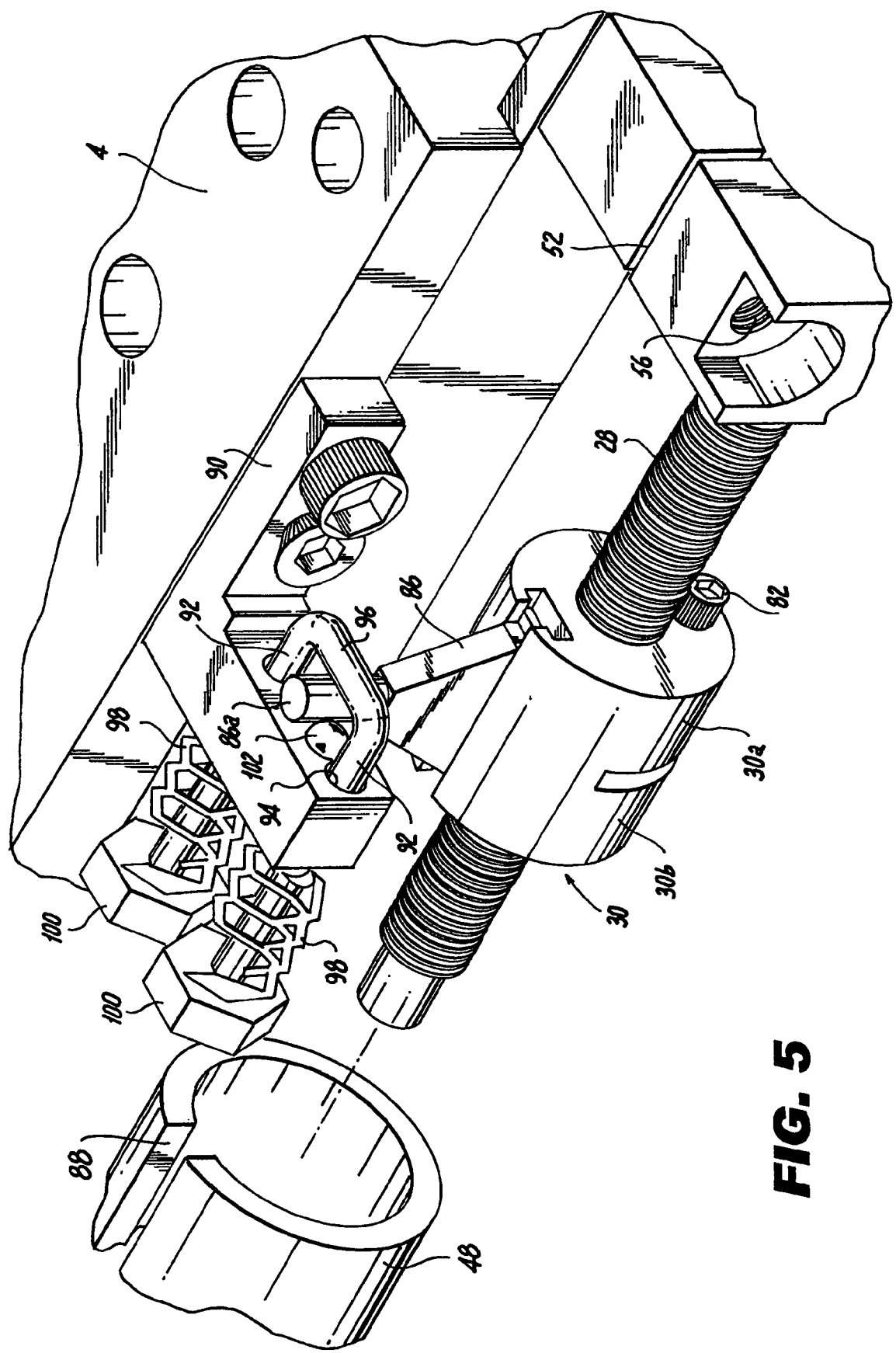
FIG. 5 is an enlarged perspective view of the lead screw, nut and connection of the nut to the moveable table with the latter in its normal operating position.

The outer surface of the nut 30 is longitudinally slotted, as at 84. Fixedly mounted within that slot and extending upwardly therefrom is a stud 86 which extends through a longitudinally extending slot 88 in the tube 48 so that it extends alongside the moveable table part 4. That table part 4 is provided with a laterally extending L-shaped bracket 90 provided with a pair of holes 92 through which the legs 94 of a U-shaped retainer 96 freely pass. Those legs 94 extend to the left of the bracket 90 where they are surrounded by compression springs 98. The ends of the legs 94 are externally threaded to adjustably receive nuts 100 effective to compress the springs 98 against the bracket 90 and thus resiliently urge U-shaped retainer 96 to the left. The upper end 86a of the lug 86 extends up inside that retainer 96, so that the compression springs 98 are effective to urge the upper end 86a of the lug 86 against the right-hand surface of the bracket 90. That surface is provided, as may best be seen in FIGS. 1 and 5, with a pair of protuberances 102, preferably in the form of balls or portions of balls against and between which the upper portion 86a of the lug 86 is received. The normal operating condition of the parts with the lug portion 86a thus received is shown in FIG. 5. In the other figures, for purposes of illustration, the lug portion 86a is artificially shown spaced from the bracket 90 and balls 102 in order to better illustrate the operative parts themselves. The ball-like protrusions 102 are preferably constituted by actual ball bearings housed within and extending from the bracket 90. The arrangement permits movement of the stud 86 and its extension 86a up and down and sideways caused perhaps by slight departure of the screw 28 from precise parallelism with the linear movement of the table part 4, or relative movement or vibration of the parts, and also effectively eliminates any longitudinal play between the nut 30 and the moveable table part 4.

There are several aspects to the structure of the present invention which, individually and in combination, produce the improvements described above.

Mounting the lead screw 28 only at its right-hand end end obviously simplifies the overall structure but gives rise to the problem of a maintaining the screw in close parallelism with the direction of movement of the table. The structure of the present invention solves that problem. The screw 28 is mounted within the tube 48 the right-hand end of which is rigidly held with respect to the table and the lefthand end of which supports the lefthand end of the lead screw 28. Residual problems of alignment and vibration are solved by the disclosed resilient connection of the screw nut 30 to the moveable table part 4 by pressing the stud part 86a against the table-carried bracket 90, the stud part 86a being received between the ball-like protuberances 102. Play is further minimized by utilizing the tube 48 to carry at its end means for axially loading the bearings 44, 46 and 64 which support the screw 28. Play is further minimized by the use of the disclosed slotted screw 30, the construction of which also minimizes friction and reduces wear. Together these elements permit one to achieve a high degree of precision with components which individually need not be held to a high degree of precision, and which may be readily assembled, and disassembled and replaced when necessary. The end result is a table which may use less expensive and more readily available parts effective when assembled to produce precision movement of the table part 2 in a reliable manner.

While but a single embodiment of the present invention has been here specifically disclosed, it will be apparent that many variations may be made therein, all without departing from the spirit of the invention as defined in the following claims:

The invention claimed is:

1. In a precision table comprising a base, a table moveable relative to said base, and means operatively connected to said table for moving same which comprises a lead screw, a nut on said screw moveable therealong as said screw is rotated, and a part operatively connected between said nut and said table, the improvement which comprises a support for one end of said screw, said support comprising a bearing in which said one end of said screw is operatively rotatably received and from which said screw extends, a tube mounted on and extending from said support and surrounding said screw, said tube having an opening through which said part extends from said nut to said table and along which said part can move as said nut moves along said screw, and a second bearing in said tube remote from said first bearing in which the other end of said screw is operatively rotatably received, in which said part is secured to said nut and extends toward said table, in combination with a member operatively connected to said table against which said part is adapted to abut, said member comprising a pair of spaced abutments between which said part is adapted to be received, and resilient means active on said part to urge it against said member, further comprising means in said tube beyond said second bearing for exerting pressure on said second bearing toward said first bearing, thereby to reduce play in one or both of said bearings.

2. The precision table of claim 1, in which said abutments are generally raised from the surface of said member, and said part is adapted to simultaneously engage said abutments.

3. The precision table of claim 2, in which said resilient means is active between said part and said member to move said part into engagement with said member.

4. The precision table of claim 2, in which said resilient means comprises spring means active between said part and said member to move said part into engagement with said member.

5. The precision table of claim 1 in which said abutments are generally raised from the surface of said member and are generally part spherical as they extend from said surface, and said part is adapted to simultaneously engage said abutments.

6. The precision table of claim 5, in which said abutments are ball-shaped.

7. The precision table of claim 5, in which said abutments comprise balls mounted on and extending from said member.

8. In the precision table of claim 1, means in said tube beyond said second bearing for exerting pressure on said second bearing toward said first bearing, thereby to reduce play in one or both of said bearings.

9. The precision table of claim 8, in which the pressure exerted by said means is adjustable.

10. The precision table of claim 9, in which said adjustable means comprises an adjustment screw accessible adjacent to the end of said tube, threadedly mounted in said tube and operatively connected to said second bearing.

11. The precision table of claim 1, in which the pressure exerted by said means is adjustable.

12. The precision table of claim 11, in which said adjustable means comprises an adjustment screw accessible adjacent to the end of said tube, threadedly mounted in said tube and operatively connected to said second bearing.

13. The precision table of claim 1, in which said abutments are generally raised from the surface of said member and are generally part spherical as they extend from said surface and said part is adapted to simultaneously engage said abutments.

14. The precision table of claim 13, in which said abutments are ball-shaped.

15. The precision table of claim 13, in which said resilient means comprises spring means active between said part and said member to move said part into engagement with said member.

16. In a precision table comprising a base, a table moveably related to said base, and means operatively connected to said table for moving same, the improvement which comprises a lead screw operatively connected to said base, a nut on said screw moveable therealong as said screw is rotated, a part secured to said nut and extending toward said table, and a member operatively connected to said table against which said part is adapted to abut, said member comprising a pair of spaced abutments between which said part is adapted to be received, and resilient means operatively active on said part to urge it against said member, in which said abutments are generally raised from the surface of said member and generally tapered in a direction away from said surface, and said part is adapted to simultaneously engage said abutments, in which said resilient means is active between said part and said member to move said part into engagement with said member, in which said resilient means comprises a generally "U" shaped element having arms connected by a head, said head engaging said part on the side of said part facing away from said member, said arms passing relatively freely through said member, and a spring active on said arms to move said head toward said member.

17. The precision table of claim 16, in which said nut comprises a body with an internally threaded opening extending in an axial direction therethrough, said body having a transversal slot partly therethrough and extending from the outer surface of said body into said through opening, thus dividing one portion of said body into two axially separated parts, and a screw in one of said parts located radially beyond said through opening, extending across said slot, and engaging the other of said parts so as to adjustably move said parts toward and away from one another.

18. The precision table of claim 16, in which said nut comprises a body with an internally threaded opening extending in an axial direction therethrough said body having a transversal slot partly therethrough and extending from the outer surface of said body into said through opening, thus dividing one portion of said body into two axially separated parts, and means for adjustably causing said parts to move toward and away from one another.

19. In a precision table comprising a base, a table moveable relative to said base, and means operatively connected to said table for moving same which comprises a lead screw, a nut on said screw moveable therealong as said screw is rotated, and a part operatively connected between said nut and said table, the improvement which comprises a support for one end of said screw, said support comprising a bearing in which said one end of said screw is operatively rotatably received and from which said screw extends, a tube mounted on and extending from said support and surrounding said screw, said tube having an opening through which said part extends from said nut to said table and along which said part can move as said nut moves along said screw, and a second bearing in said tube remote from said first bearing in which the other end of said screw is operatively rotatably received, in which said part is secured to said nut and extends toward said table, in combination with a member operatively connected to said table against which said part is adapted to abut, said member comprising a pair of spaced abutments between which said part is adapted to be received, and resilient means active on said part to urge it against said member, in which said resilient means comprises a generally "U" shaped element having arms connected by a head, said head engaging said part on the side of said part facing away from said member, said arms passing relatively freely through said member, and a spring active on said arms to move said head toward said member.

* * * * *